United States Patent

Phillips et al.

[11] Patent Number: 5,198,482
[45] Date of Patent: Mar. 30, 1993

[54] CORROSION-INHIBITING COATING COMPOSITIONS

[75] Inventors: Emyr Phillips, Wakefield, England; Adalbert Braig, Weil-Friedlinger, Fed. Rep. of Germany

[73] Assignee: Ciba-Geigy Corporation, Ardsley, N.Y.

[21] Appl. No.: 718,073

[22] Filed: Jun. 20, 1991

Related U.S. Application Data

[63] Continuation-in-part of Ser. No. 450,647, Dec. 14, 1989, abandoned.

[51] Int. Cl.$^5$ .......................... C08K 5/34; C08K 5/48
[52] U.S. Cl. ..................................................... 524/94
[58] Field of Search .................... 252/402; 524/94; 106/287.21

[56] References Cited

U.S. PATENT DOCUMENTS

| | | | |
|---|---|---|---|
| 4,329,381 | 5/1982 | Eschwey et al. | 427/386 |
| 4,568,753 | 2/1986 | Akashi et al. | 548/174 |
| 4,612,049 | 9/1986 | Berner | 428/458 |

FOREIGN PATENT DOCUMENTS

| | | |
|---|---|---|
| 0128862 | 12/1984 | European Pat. Off. |
| 0129506 | 12/1984 | European Pat. Off. |
| 0183647 | 6/1986 | European Pat. Off. |
| 301271 | 8/1988 | Japan |

OTHER PUBLICATIONS

C.A. 108:99653y.
Chem. Abst. 100, 160761k (1984).

*Primary Examiner*—Kriellion S. Morgan
*Attorney, Agent, or Firm*—Luther A. R. Hall; William A. Teoli, Jr.

[57] ABSTRACT

The present invention provides a corrosion-inhibiting coating composition comprising:
a) an acid-sensitive film former; and
b) as a corrosion inhibitor, an effective amount of a salt of
i) an aliphatic or cycloaliphatic mono-, di tri- or tetra-carboxylic acid which is substituted in its aliphatic or cycloaliphatic radical by at least one group of the formula

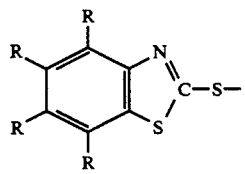

I in which each R independently of the others is hydrogen, alkyl, halogenoalkyl, alkoxy, alkylthio, alkylsulfonyl, cycloalkyl, phenyl, alkylphenyl, phenylalkyl, halogen, —CN, —NO$_2$, —COOH, COOalkyl, —OH or a primary, secondary or tertiary amino or carbamoyl group; with ii) n molar equivalents of an amine of the formula

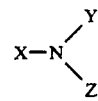

in which X, Y and Z are the same or different and each it hydrogen, alkyl optionally interrupted by one or more oxygen atoms, or alkyl substituted by hydroxy, or is phenyl, phenyl alkyl or alkylphenyl; and n is 1, 2, 3 or 4 depending upon the number of carboxyl groups in the carboxylic acid b i).

12 Claims, No Drawings

CORROSION-INHIBITING COATING COMPOSITIONS

This is a continuation-in-part of application Ser. No. 450,647, filed on Dec. 14, 1989 now abandoned.

The present invention relates to coating compositions, in particular to coating compostions containing, as corrosion inhibitors, amine salts of heterocyclic carboxylic acids.

Protection against corrosion is one of the most important functions of organic coating compositions for metal substrates. Many suggestions for improving the protection of coatings against corrosion are to be found in the literature, for example in H. Kittel, Lehrbuch der Lacke und Beschichtungen ("Textbook of Paints and Coatings"), Volume V, Stüttgart 1977, 46–103.

On the one hand, the barrier function of the coating composition can be improved, in order to keep corrosive agents, such as oxygen, water and ions, away from the metal surface. On the other hand, it is possible to employ corrosion-inhibiting pigments which intervene chemically or electrochemically in the corrision process, for example by the formation of insoluble deposits with corrosion products or by passivation (polarisation) of the metal surface. Metal chromates and lead compounds rank amongst the most effective corrosion-inhibiting pigments. Much use has been made of metal chromates, particularly because they inhibit both anodic and cathodic corrosion. Nowadays there are certain objections to the use of chromates owing to their potential carcinogenic action. Similarly, there are objections to the use of lead compounds owing to their chronic toxicity.

Metal salts of organic compounds have also been frequently suggested as corrosion inhibitors. Thus, for example, European Patent Specification 3,187 recommends the use of zinc or lead salts of hydroxy or mercapto compounds of 5-membered or 6-membered heterocyclic compounds containing the characteristic group

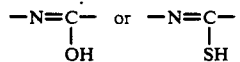

Typical examples of these are the Zn or Pb salts of 2-mercaptobenzthiazole.

More recently, in European Patent Application 128862 and U.S. Pat. No. 4,612,049, there have been described
corrosion-inhibiting coating compositions containing:
a) a film-former,
b) as the corrosion inhibitor, an effective amount of an aliphatic or cycloaliphatic mono-, di-, tri- or tetracarboxylic acid which is subsituted in its aliphatic or cycloaliphatic radical by at least one group of the formula

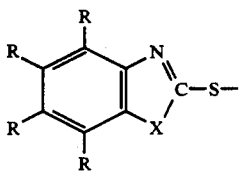

in which X is oxygen, sulfur or NH and each R independently of the others is hydrogen, alkyl, halogenoalkyl, alkoxy, alkylthio, alkylsulfonyl, cycloalkyl, phenyl, alkylphenyl, phenylalkyl, halogen, —CN, —NO$_2$, —COOH, COOalkyl, —OH or a primary, secondary or tertiary amino or carbamoyl group, R not being —NH$_2$, in the case of a monocarboxylic acid in which X is sulfur, and also base addition salts of these compounds.

The coating compositions of EP 128862 provide outstanding corrosion protection when the film former, component a) does not contain an acid-sensitive component.

When, however, the coating compositions of EP 128862 comprise as film-forming component a), an acid-sensitive component, e.g. when the film former a) is an epoxy resin, a polyurethane resin or it contains a basic binder material, unacceptable viscosity changes and/or coagulation and/or discolouration may occur in the coating composition.

We have found that these potential problems with certain film formers may be overcome by employing an amine salt of the aliphatic or cycloaliphatic mono-, di-, tri- or tetracarboxylic acid as defined in EP 128862.

Japanese Sho 63-301271 describes water-soluble rust inhibiting coating compositions comprising a film-forming resin and an amine salt of benzothiazol-2-ylthiosuccinic acid where the amine is N(R$_1$)(R$_2$)(R$_3$) where R$_1$, R$_2$ and R$_3$ are independently hydrogen or alkyl of 1 to 8 carbon atoms. These amine salts are aimed at water-soluble applications of film-forming resins such as acrylic, epoxy, or alkyd resins used in paints.

Accordingly, the present invention provides a corrosion-inhibiting coating composition comprising:
a) an acid-sensitive film former and
b) as a corrosion inhibitor, an effective amount of a salt of
  i) an aliphatic or cycloaliphatic mono-, di-, tri- or tetra-carboxylic acid which is substituted in its aliphatic or cycloaliphatic radical by at least one group of the formula

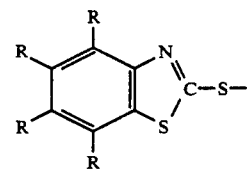

I in which each R independently of the others is hydrogen, alkyl, halogenoalkyl, alkoxy, alkylthio, alkylsulfonyl, cycloalkyl, phenyl, alkylphenyl, phenylalkyl, halogen, —CN, —NO$_2$, —COOH, —COOalkyl, —OH or a primary, secondary or tertiary amino or carbamoyl group;
with ii) n molar equivalents of an amine of the formula

in which X, Y and Z are the same or different and each is hydrogen, alkyl optionally interrupted by one or more oxygen atoms, or alkyl substituted by hydroxy, or is phenyl, phenylalkyl or alkylphenyl; and n is 1, 2, 3 or 4 depending upon the number of carboxyl groups in the carboxylic acid b i).

As alkyl, alkoxy, alkylthio or alkylsulfonyl, R preferably contains 1-12 C atoms, especially 1-6 C atoms. Examples of these are methyl, ethyl, propyl, isopropyl, n-butyl, isobutyl, tert.-butyl, pentyl, hexyl, octyl, nonyl, decyl, undecyl, dodecyl and the corresponding alkoxy, alkylthio and alkylsulfonyl radicals. As cycloalkyl, R preferably contains 5-8 C atoms. Examples of these are cyclopentyl, cyclohexyl or cyclooctyl.

As halogenalkyl, R preferably contains 1-4 C atoms and 1-3 fluorine or chlorine atoms. Examples of these are chloromethyl, fluoromethyl, difluoromethyl, trifluoromethyl or 2-chloroethyl.

As alkylphenyl, R preferably contains 7-16 C atoms and can be for example, tolyl, xylyl, 4-isopropylphenyl, 4-tert.-butylphenyl, 4-octylphenyl or 4-decylphenyl. As phenylalkyl, R preferably contains 7-9 C atoms and can be, for example, benzyl, 1-phenylethyl, 2-phenylethyl, α,α-dimethylbenzyl or 3-phenylpropyl.

As halogen, R is preferably fluorine, chlorine or bromine. If R is —COOalkyl, the alkyl group preferably has 1-4 C atoms.

As an amino group or carbamoyl group, R preferably has up to 20 C atoms. Examples of these are groups —$NH_2$, —$NHCH_3$, —$NHC_{12}H_{15}$, —NH-cyclohexyl, —NH-phenyl, —$N(CH_3)_2$, —$N(C_4H_9)_2$, —$N(CH_3)$(benzyl), morpholino, piperidino, —$CONH_2$, —CONH-phenyl, —$CONHC_8H_{17}$, —$CON(C_2H_5)_2$, —$CON(CH_2CH_2OH)_2$, morpholinocarbonyl or piperidinocarbonyl.

Preferably, one of the substituents R is hydrogen, $C_1$-$C_4$-alkyl, $C_1$-$C_4$-alkoxy and the other three R are hydrogen. It is particularly preferably for all four R to be hydrogen.

As alkyl X, Y and Z preferably contain 1-24 C atoms, especially 6-24 C atoms, more especially 8-14 C atoms. Examples are methyl, ethyl, propyl, isopropyl, n-butyl, isobutyl, tert.butyl, pentyl, hexyl, octyl, nonyl, decyl, dodecyl, decyl, tetradecyl, hexadecyl, octadecyl, eicosyl, and tetraeicosyl radicals. Alkyl radicals X, Y and Z interrupted by one or more oxygen atoms include methoxymethyl, 1-methoxyethyl, 2-ethoxypropyl, 1-methoxybutyl, n-butoxymethyl and 4-isopropoxybutyl. Alkyl radicals X, Y and Z substituted by hydroxy are e.g. hydroxymethyl, 1-hydroxyethyl, 1-hydroxypropyl, 2-hydroxypropyl and 1-hydroxybutyl.

As phenylalkyl, X, Y and Z preferably contain 7-9 C atoms and may be, e.g., benzyl, 1-phenylethyl, 2-phenylethyl, α,α-dimethylbenzyl or 3-phenylpropyl.

The component bi) is preferably a monocarboxylic or dicarboxylic acid, in particular a dicarboxylic acid. The substituent of the formula I is preferably in the beta-position in relation to a carboxyl group.

The component bi) is preferably an aliphatic monocarboxylic or polycarboxylic acid which has 2-20 C atoms or a cycloaliphatic monocarboxylic or polycarboxylic acid which has 4-12, in particular 6-8, C atoms and which is substituted by a group of the formula I.

In addition to the group of the formula I, the carboxylic acid can also have other substituents, for example hydroxyl, alkoxy, halogen or aryl.

Components bi) which are preferred are compounds of the formula II

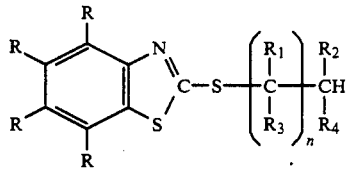

in which R has the meaning given above, n is zero or one and $R_1$, $R_2$, $R_3$ and $R_4$ independently of one another are hydrogen, alkyl, hydroxyalkyl, halogenalkyl, alkoxyalkyl, carboxyalkyl, carboxyl or phenyl or phenylalkyl which is unsubstituted or monosubstituted or disubstituted, or $R_1$ and $R_2$ or $R_1$ and $R_3$ together are linear or branched alkylene which can be substituted by 1 or 2 carboxyl groups, or $R_1$ and $R_2$ together are a direct bond, and at least one of the substituents $R_1$, $R_2$, $R_3$ and $R_4$ is a carboxyl or carboxyalkyl group. In formula II, n is preferably one.

As alkyl, $R_1$, $R_2$, $R_3$ and $R_4$ are preferably $C_1$-$C_{18}$-alkyl, for example methyl, ethyl, n-propyl, isopropyl, n-butyl, isobutyl, tert.-butyl, pentyl, hexyl, octyl, dodecyl or octadecyl. As hydroxyalkyl or halogenoalkyl, these substituents preferably have 1-4 C atoms. Examples of these are hydroxymethyl, 1-hydroxyethyl, 2-hydroxyethyl, 2-hydroxypropyl, 3-hydroxypropyl, chloromethyl, bromoethyl or bromoisopropyl. As alkoxyalkyl, these substituents preferably have 2-10 C atoms. Examples of these are methoxymethyl, 1-methoxyethyl, 2-ethoxypropyl, 1-methoxybutyl, n-butoxymethyl or 4-isopropoxybutyl.

As carboxyalkyl, $R_1$, $R_2$, $R_3$ and $R_4$ are preferably $C_2$-$C_{12}$-carboxyalkyl, for example carboxymethyl, 1-carboxyethyl, 2-carboxyethyl, 3-carboxypropyl, 2-carboxyisopropyl, 1-carboxybutyl, 2-carboxybutyl, 1-, 2- or 3-carboxyhexyl, 1,2-dicarboxyethyl or 2,3,4-tricarboxyl-1-butyl. As substituted or unsubstituted phenyl or phenylalkyl, the same substituents can be, for example, 4-chlorophenyl, 3-nitrophenyl, tolyl, xylyl, 3-methoxyphenyl, 4-isopropylphenyl, 3-carboxyethyl, 4-hydroxyphenyl, 4-bromobenzyl, 4-tert.-butylbenzyl, 2-phenylethyl or 3-phenylpropyl, but are preferably phenyl or benzyl.

If $R_1$ and $R_2$ or $R_1$ and $R_3$ together are alkylene, they are preferably $C_3$-$C_4$-alkylene and they form, together with the C atoms to which they are linked, a cycloalkane ring, preferably a cyclopentane or cyclohexane ring, which can be substituted by alkyl groups, preferably $C_1$-$C_4$-alkyl groups, or by 1 or 2 carboxyl groups.

If $R_1$ and $R_2$ together are a direct bond, the compounds of the formula II are unsaturated carboxylic acids.

$R_1$, $R_2$, $R_3$ and $R_4$ are preferably hydrogen, $C_1$-$C_4$-alkyl, carboxyl or $C_2$-$C_6$-carboxyalkyl. It is particularly preferably for $R_4$ to be a carboxyl group. Compounds of the formula II in which at least two of the substituents $R_1$, $R_2$, $R_3$ and $R_4$ are a carboxyl or carboxyalkyl group are also preferred.

The following are examples of the component bi) benzothiazol-2-ylthioacetic acid,
5-carboxybenzothiazol-2-ylthioacetic acid,
3-(benzothiazol-2-ylthio)-propionic acid,
5-trifluoromethylbenzothiazol-2-ylthiopropionic acid,
4-(benzothiazol-2-ylthio)-butyric acid,
3-(benzothiazol-2-ylthio)-butyric acid,
3-(benzothiazol-2-ylthio)-methylbutyric acid,
benzothiazol-2-ylthiomalonic acid, benzothiazol-2-ylthiosuccinic acid,
5-methylbenzothiazol-2-ylthiosuccinic acid,
6-ethylbenzothiazol-2-ylthiosuccinic acid,
4-isopropylbenzothiazol-2-ylthiosuccinic acid,
7-t-butylbenzothiazol-2-ylthiosuccinic acid,
5-n-hexylbenzothiazol-2-ylthiosuccinic acid,
6-(1,1,3,3-tetramethylbutyl)-benzothiazol-2-ylthiosuccinic acid,
6-cyclohexylbenzothiazol-2-ylthiosuccinic acid,
7-benzylbenzothiazol-2-ylthiosuccinic acid,
6-methoxybenzothiazol-2-ylthiosuccinic acid,
6-ethoxybenzothiazol-2-ylthiosuccinic acid,
7-ethoxybenzothiazol-2-ylthiosuccinic acid,
5-methoxybenzothiazol-2-ylthiosuccinic acid,
4-methylthiobenzothiazol-2-ylthiosuccinic acid,
4-fluorobenzothiazol-2-ylthiosuccinic acid,
5-chlorobenzothiazol-2-ylthiosuccinic acid,
7-bromobenzothiazol-2-ylthiosuccinic acid,
6-chlorobenzothiazol-2-ylthiosuccinic acid,
4-phenylbenzothiazol-2-ylthiosuccinic acid,
5-trifluoromethylbenzothiazol-2-ylthiosuccinic acid,
5-carboxybenzothiazol-2-ylthiosuccinic acid,
6-methylsulfonylbenzothiazol-2-ylthiosuccinic acid,
5-cyanobenzothiazol-2-ylthiosuccinic acid,
6-nitrobenzothiazol-2-ylthiosuccinic acid,
5-cyanobenzothiazol-2-ylthiosuccinic acid,
7-hydroxybenzothiazol-2-ylthiosuccinic acid,
6-chloro-4-methylbenzothiazol-2-ylthiosuccinic acid,
5-chloro-6-n-butylbenzothiazol-2-ylthiosuccinic acid,
4-bromo-5-n-hexylbenzothiazol-2-ylthiosuccinic acid,
5-nitro-6-n-propylbenzothiazol-2-ylthiosuccinic acid,
5-bromo-6-n-propoxybenzothiazol-2-ylthiosuccinic acid,
6-aminobenzothiazol-2-ylthiosuccinic acid,
6-methylaminobenzothiazol-2-ylthiosuccinic acid,
5-dimethylaminobenzothiazol-2-ylthiosuccinic acid,
7-phenylaminobenzothiazol-2-ylthiosuccinic acid,
6-diphenylaminobenzothiazol-2-ylthiosuccinic acid,
4-benzylaminobenzothiazol-2-ylthiosuccinic acid,
4-morpholinobenzothiazol-2-ylthiosuccinic acid,
5-carbamoylbenzothiazol-2-ylthiosuccinic acid,
5-methylcarbamoylbenzothiazol-2-ylthiosuccinic acid,
5-diethylcarbamoylbenzothiazol-2-ylthiosuccinic acid,
6-phenylcarbamoylbenzothiazol-2-ylthiosuccinic acid,
5,6-dimethylbenzothiazol-2-ylthiosuccinic acid,
4,5,6-triethylbenzothiazol-2-ylthiosuccinic acid,
4,5,6,7-tetramethylbenzothiazol-2-ylthiosuccinic acid,
1-(benzothiazol-2-ylthio)-propane-1,2-dicarboxylic acid,
3-(benzothiazol-2-ylthio)-propane-1,2-dicarboxylic acid,
3-(6-trifluoromethylbenzothiazol-2-ylthio)-propane-1,2-dicarboxylic acid,
3-(6-methoxycarbonylbenzothiazol-2-ylthio)-propane-1,2-dicarboxylic acid,
3-(6-aminobenzothiazol-2-ylthio)-propane-1,2-dicarboxylic acid,
3-(5-ethylaminobenzothiazol-2-ylthio)-propane-1,2-dicarboxylic acid,
3-(4-dibutylaminobenzothiazol-2-ylthio)-propane-1,2-dicarboxylic acid,
4-(morpholinobenzothiazol-2-ylthio)-propane-1,2-dicarboxylic acid,
1-(4-phenylbenzothiazol-2-ylthio)-propane-1,2-dicarboxylic acid,
1-(benzothiazol-2-ylthio)-propane-1,3-dicarboxylic acid,
1-(6-ethylbenzothiazol-2-ylthio)-propane-1,3-dicarboxylic acid,
2-(benzothiazol-2-ylthio)-propane-1,3-dicarboxylic acid,
2-(5-carboxybenzothiazol-2-ylthio)-propane-1,3-dicarboxylic acid,
3-(benzothiazol-2-ylthio)-3-phenylpropane-1,2-dicarboxylic acid,
3-(benzothiazol-2-ylthio)-3-(4-carboxyphenyl)-propane-1,2-dicarboxylic acid,
3-(benzothiazol-2-ylthio)-3-(2,4-dicarboxyphenyl)-propane-1,2-dicarboxylic acid,
3-(benzothiazol-2-ylthio)-3,3-diphenylpropane-1,2-dicarboxylic acid,
1-(benzothiazol-2-ylthio)-butane-1,2-dicarboxylic acid,
1-(4-methoxy-6-hydroxybenzothiazol-2-ylthio)-butane-1,2-dicarboxylic acid,
3-(4,5-dimethyl-7-propoxybenzothiazol-2-ylthio)-propane-1,2-dicarboxylic acid,
1-(benzothiazol-2-ylthio)-2-methylpropane-1,2-dicarboxylic acid,
2-(benzothiazol-2-ylthio)-butane-2,3-dicarboxylic acid,
1-(benzothiazol-2-ylthio)-butane-2,4-dicarboxylic acid,
4-(benzothiazol-2-ylthio)-butane-1,2,3-tricarboxylic acid,
4-(benzothiazol-2-ylthio)-butane-1,4-dicarboxylic acid,
1-(benzothiazol-2-ylthio)-pentane-1,5-dicarboxylic acid,
3-(benzothiazol-2-ylthio)-hexane-1,2-dicarboxylic acid,
8-(benzothiazol-2-ylthio)-octane-1,3,5,7-tetracarboxylic acid,
1-(benzothiazol-2-ylthio)-cyclohexane-1,2-dicarboxylic acid,
4-(benzothiazol-2-ylthio)-cyclohexane-1,2-dicarboxylic acid,
1-(benzothiazol-2-ylthio)-propane-1,2,3-tricarboxylic acid,
1-(benzothiazol-2-ylthio)-3-chloropropane-1,2-dicarboxylic acid,
1-(benzothiazol-2-ylthio)-3-methoxypropane-1,2-dicarboxylic acid,
1-(benzothiazol-2-ylthio)-3-hydroxypropane-1,2-dicarboxylic acid,
1-(benzothiazol-2-ylthio)-2-phenylsuccinic acid,
1-(benzothiazol-2-ylthio)-2-benzylsuccinic acid,
1-(benzothiazol-2-ylthio)-3-methylbutane-1,3-dicarboxylic acid,
3-(benzothiazol-2-ylthio)-hexane-3,4-dicarboxylic acid,
2,3-bis-(benzothiazol-2-ylthio)-butane-1,4-dicarboxylic acid,
and mixtures thereof.

Component b ii) is preferably a $C_1$–$C_{24}$ especially a $C_8$–$C_{14}$ mono- or dialkylamine.

The following are examples of the component bii):
ammonia
methylamine
ethylamine
n-propylamine
iso-propylamine
n-butylamine
iso-butylamine
t-butylamine
n-/iso/t-amylamine
n-hexylamine
n-heptylamine
n-octylamine
iso-octylamine
t-octylamine
n-nonylamine n-decylamine
n-dodecylamine
iso-dodecylamine
t-dodecylamine
n-tridecylamine
iso-tridecylamine
t-tridecylamine
n-tetradecylamine
iso-tetradecylamine
t-tetradecylamine
n-octadecylamine
iso-octadecylamine
t-octadecylamine
n-nonadecylamine
iso-nonadecylamine
t-nonadecylamine
n-eicosamine
iso-eicosamine
t-eicosamine
n-heneicosamine
iso-heneicosamine
t-heneicosamine
n-docosamine
iso-docosamine
t-docosamine
n-tricosamine
iso-tricosamine
t-tricosamine
n-tetracosamine
iso-tetracosamine
t-tetracosamine
benzylamine
di-benzylamine
N-benzylaniline
dimethylamine
di-iso-propylamine
di-iso-propylamine
di-n-butylamine
di-t-butylamine
di-n-octylamine
di-2-ethylhexylamine
di-n-dodecylamine
di-n-eicosylamine
di-n-tetraeicosylamine
methoxymethylamine
methoxyethylamine
butoxypropylamine
hexoxybutylamine
nonyloxypropylamine
aniline
N-methylaniline
N-ethylaniline and mixtures thereof.

A most preferred embodiment of the instant invention pertains to a corrosion-inhibiting coating composition comprising
(a) an acid-sensitive film former, and
(b) an effective corrosion inhibiting amount of an amine salt of an aliphatic or cycloaliphatic dicarboxylic acid of formula II

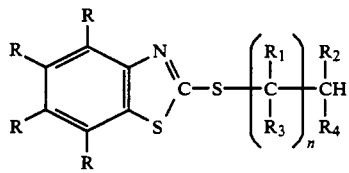

II in which each R independently of the others is hydrogen, alkyl of 1 to 12 carbon atoms, halogenoalkyl of 1 to 4 carbon atoms, alkoxy of 1 to 12 carbon atoms, alkylthio of 1 to 12 carbon atoms, alkylsulfonyl of 1 to 12 carbon atoms, cycloalkyl of 5 to 8 carbon atoms, phenyl, alkylphenyl of 7 to 16 carbon atoms, phenylalkyl of 7 to 9 carbon atoms, halogen, —CN, —NO$_2$, —COOH, —COOalkyl where alkyl is of 1 to 4 carbon atoms, —OH or a primary, secondary or tertiary amino or carbamoyl group of up to 20 carbon atoms; n is zero or one;

$R_1$, $R_2$, $R_3$ and $R_4$ independently of one another are hydrogen, alkyl of 1 to 18 carbon atoms, hydroxyalkyl of 1 to 4 carbon atoms, alkoxyalkyl of 2 to 10 carbon atoms, carboxylalkyl of 2 to 12 carbon atoms, carboxyl, phenyl or phenylalkyl of 7 to 9 carbon atoms, or $R_1$ and $R_2$ or $R_1$ and $R_3$ together are linear or branched alkylene of 3 to 4 carbon atoms, where two of the substituents $R_1$, $R_2$, $R_3$ and $R_4$ are carboxyl or carboxyalkyl;

with two molar equivalents of an amine or mixture of amines of the formula N(X)(Y)(Z) in which X, Y and Z are the same or different and each is independently hydrogen, alkyl of 1 to 24 carbon atoms, said alkyl interrupted by one or more oxygen atoms, hydroxyalkyl of 1 to 4 carbon atoms, phenyl, phenylalkyl of 7 to 9 carbon atoms or alkylphenyl of 7 to 16 carbon atoms, and where at least one of X, Y and Z or at least one of X, Y and Z in at least one of the amines when a mixture of amines is used is alkyl of 10 to 24 carbon atoms or said alkyl interrupted by one or more oxygen atoms.

These compositions differ from those of Japanese Sho 63-301271 by having at least one of the moieties a'-tached to the amine N-atom being a long chain alkyl of 10 to 24 carbon atoms or said alkyl interrupted by one or more oxygen atoms. Such a moiety would tend to decrease the water solubility of the instant compounds of component (b) to a large extent.

Another aspect of the instant invention is the amine salt of component (b) of the instant compositions as defined above. Especially preferred is a salt of the formula

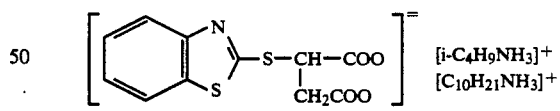

The preparation of the compounds can be effected in accordance with a process described in European Patent Application 129506, by reacting a compound of the formula II

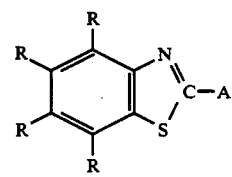

III in which A is a leaving group, for example Cl, Br, I or p-tosyloxy, with a compound of the formula

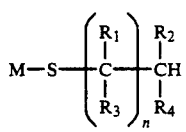

in which M is hydrogen or a cation, for example an alkali metal cation, alkaline earth metal cation or ammonium cation. Alternatively, a compound of the formula IV

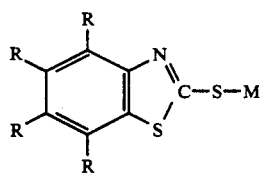

can be reacted with a compound of the formula

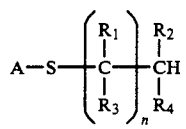

Compounds of the formula II in which $R_4$ is carboxyl can also be prepared by reacting IV, in which M is hydrogen, with an $\alpha,\beta$-unsaturated acid of the formula

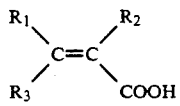

in accordance with a process which is described in U.S. Pat. No. 4,612,378

Salts may be prepared from components bi) and bii) by heating together the said components at 30°–130° C. preferably at 50°–60° C., optionally in a solvent e.g. methanol, xylene, or tetrahydrofuran.

The component a) can be any desired acid-sensitive film-former, such as those which are knwon as binders for coating compositions. In particular, it can be an epoxide resin, polyurethane resin, aminoplast resin, or a mixture of such resins or a basic aqueous dispersion or solution of an acidic resin. The film-forming component a) may be a solution of the binder resin in an organic solvent, it may be an aqueous solution or dispersion or it may be a solid powder. Of special industrial importance are "high solids coatings" containing a limited amount of organic solvent. Suitable epoxide resins are those which have an average more than one epoxide group per molecule, for example bis-(2,3-epoxypropylcyclohexyl) ether, 4-epoxyethylcyclohexene oxide or the 2-methyl-4,5-epoxycyclohexylmethyl ester of 2-methyl-4,5-epoxycyclohexanecarboxylic acid; diglycidyl and polyglycidyl esters of aliphatic polyols, for example 1,4-butanediol or polyalkylene glycols; diglycidyl or polyglycidyl ethers of cycloaliphatic polyols, for example 2,2-bis-(4-hydroxycyclohexyl)-propane; diglycidyl and polyglycidyl ethers of aromatic polyols, for example resorcinol, bis-(4-hydroxyphenyl)-methane, 2,2-bis-(4-hydroxyphenyl)-propane, 2,2-bis-(4-hydroxy-3,5-dibromophenyl)-propane, 1,1,2,2-tetrakis-(4-hydroxyphenyl)-ethane or condensation products of phenols with formaldehyde, such as phenol or cresol novolacs; $\beta$-methylglycidyl ethers of polyols; glycidyl esters of polybasic carboxylic acids, for example phthalic, tetraphthalic, tetrahydrophthalic or hexahydrophthalic acid; N-glycidyl derivatives or amines, amides or nitrogen-heterocyclic compounds, for example N,N-diglycidylaniline, N,N-diglycidyltoluidine or N,N,N',N'-tetraglycidyl-bis-(4-aminophenyl)-methane, triglycidyl isocyanurate, N,N'-diglycidylethyleneurea, N,N'-diglycidyl-5,5-diethylhydantoin; N,N'-diglycidyl-5-isopropylhydantoin or N,N'-diglycidyl-5,5-dimethyl-6-isopropyl-5,6-dihydrouracil.

Preferred epoxide resins are those based on aromatic polyols, in particular bisphenols. The epoxide resins are used in conjunction with a curing agent. The latter can be, in particular, an amino or hydroxy compound or an acid or an acid anhydride or a Lewis acid. Examples of these are polyamines, polyaminoamides, polysulfide polymers, polyphenols, boron fluoride and complexes thereof, polycarboxylic acids, 1,2-dicarboxylic acid anhydrides or pyromellitic dianhydride.

In addition to the components a) and b), the coating compositions can also contains further components, for example pigments, dyes, extenders and other additives such as are customary for coating compositions. The pigments can be organic, inorganic or metallic pigments, for example titanium dioxide, iron oxide, aluminium bronze, phthalocyanine blue etc. It is also possible to use concomitantly anti-corrosion pigments, for example pigments containing phosphates or borates, metal pigments and metal oxide pigments (see Farbe und Lack 88 (1982), 183) or the pigments descirbed in European Patent A 54,267. Examples of extenders which can be used concomitantly are talc, chalk, alumina, baryte, mica or silica. Examples or further additives are flow control auxiliaries, dispersing agents, thioxotropic agents, adhesion promoters, antioxidants, light stabilisers or curing catalysts.

Particular importance attaches the addition of basic extenders or pigments. In certain binder systems, for example in acrylic and alkyd resins, these produce a synergistic effect on the inhibition of corrosion. Examples or such basic extenders or pigments are calcium carbonate, magnesium carbonate, zinc oxide, zinc carbonate, zinc phosphate, magnesium oxide, aluminium oxide, aluminium phosphate or mixtures thereof. Examples of pigments are those based on aminoanthraquinone.

Finally, the corrosion inhibitor can also be applied to a neutral carrier. Suitable carriers are, in particular, pulverulent extenders or pigments. This technique is described in greater detail in German Offenlegungsschrift 3,122,907.

In addition to the component b), the coating composition can also contain another organic, metal-organic or inorganic corrosion inhibitor, for example salts of nitroisophthalic acid, tannin, phosphoric esters, technical amines, substituted benztriazoles or substituted phenols, such as are described in German Offenlegungsschrift 3,146,265.

The coating compositions according to the invention are preferably used as a primer on metallic substrates, in particular on iron, steel, copper, zinc and aluminium. Here they can function as so-called conversion coatings, in that chemical reactions take place at the interface between the metal and the coating. The application of the coatings can be effected by the customary methods, such as spraying, brushing, roller-coating, dipping or electrodeposition, in particular cathodic deposition. Depending on whether the film-former is a resin which dries physically or can be cured by heat or radiation, the curing of the coatings is carried out at room temperature, by stoving or by irradiation.

The corrosion inhibitors can be added to the coating composition during the preparation of the latter, for example during the distribution of the pigment by grinding or the inhibitors are dissolved beforehand in a solvent and the solution is stirred into the coating composition. The inhibitor is used in an amount of 0.01-20% by weight, preferably 0.1-5% by weight, based on the solids content of the coating composition.

The following Examples describe the coating compositions according to the invention and their use in greater detail.

EXAMPLE 1

11.9 Parts of benzothiazol-2-ylthiosuccinic acid, suspended in 28.7 parts xylene, are treated with 16.8 parts of t-tridecylamine. The resulting slurry is heated to 60° C. to give a pale yellow solution. Evaporation of this solution gives 39 parts bis (t-tridecylammonium) benzothiazol-2-ylthiosuccinate as a viscous yellow oil.

Potentiometric analysis shows the salt to contain 42.4% benzothiazol-2-ylthiosuccinic acid and 57.6% t-tridecylamine, a molar ratio of 1:2.03.

EXAMPLE 2

56.6 Parts of benzothiazol-2-ylthiosuccinic acid, and 98.0 parts of di-2-ethylhexylamine are mixed, and warmed to 50° C. to give 154 parts of bis(di-2-ethylhexylammonium) benzthiazol-2-ylthiosuccinate as a pale yellow oil.

Potentiometric analysis shows the salt to contain 36.98% benzothiazol-2-ylthiosuccinic acid and 63.02% di-2-ethyl-hexylamine, a molar ratio of 1:2.

EXAMPLE 3

160.8 Parts of i-nonyloxypropylamine are added to a solution of 113.2 parts benzothiazol-2-ylthiosuccinic acid, in 100 parts tetrahydrofuran. Evaporation of this solution gives 274 parts bis (isononyloxypropylammonium) benzothiazol-2-ylthiosuccinate as a brown oil.

Potentiometric titration shows the salt to contain 39.75% benzothiazol-2-ylthiosuccinic acid and 60.25% isononyloxypropylamine, a molar ratio of 1:2.

EXAMPLE 4

104.3 Parts of t-eicosylamine and 99 parts of benzothiazol-2-ylthiosuccinic acid are mixed and warmed to 50° C. to give 203 parts bis(t-eicosylammonium) benzothiazol-2-ylthiosuccinate.

Potentiometric analysis shows the salt to contain 34.5% benzothiazol-2-ylthiosuccinic acid and 65.5% t-eicosylamine, a molar ratio of 1:2.

EXAMPLE 5

141.5 Parts of benzothiazol-2-ylthiosuccinic acid and 129 parts of t-octylamine are suspended in tetrahydrofuran at 65° C. A clear solution is obtained, from which 270 parts bis(t-octylammonium) benzothiazol-2-ylthiosuccinate precipitates.

Potentiometric analysis shows the salt to contain 52.3% benzothiazol-2-ylthiosuccinic acid and 47.7% t-octylamine, a molar ratio of 1:2.

EXAMPLES 6 to 10

A two-pack epoxy primer is prepared using the following formulation:

16.0 parts wt. of Araldite GT 6071 (Araldite is a registered Trade Mark) as a 75% solution in a mixture of toluene and n-butanol;

| | |
|---|---|
| 37.1 | parts wt. of red iron oxide; |
| 20.1 | parts wt. of micronised talc; |
| 16.1 | parts wt. of propyleneglycol monomethyl ether; |
| 6.9 | parts wt. of isopropanol; |
| 3.2 | parts wt. of Solvesso 100 and |
| 0.6 | part wt. of soya lecithin. |
| 1.88 | pts. wt. (3%) of a product of Examples 1 to 5, | is dispersed into a separate sample of the epoxy part, on a ball mill. The concentration of corrosion inhibitor of this invention is based on the solids content of the total system (including polyaminoamide hardener). The solids content of the formulation is 62.6%, calculated for 100 g of finished paint including hardener.

After the dispersion procedure, 50 pts. wt. of polyaminoamide hardener (HY 815 as a 50% solution) are added.

The viscosity properties of the paints so obtained are set out in the following Table I:

TABLE I

| Example | Additive | % Add. | Initial viscosity (poise) | Viscosity after 30 mins (poise) |
|---|---|---|---|---|
| — | Control | nil | 2.9 | 3.0 |
| 6 | Product Ex. 1 | 3% | 3.3 | 3.2 |
| 7 | Product Ex. 2 | 3% | 2.8 | 3.1 |
| 8 | Product Ex. 3 | 3% | 2.2 | 2.9 |
| 9 | Product Ex. 4 | 3% | 3.1 | 3.0 |
| 10 | Product Ex. 5 | 3% | 3.4 | 3.3 |

It can be seen that incorporation of an amine salt corrosion inhibitor of the invention of the invention causes no significant viscosity change. When used at the same level of addition the free carboxylic acid counterpart of the amine salts of Examples 1 to 5 causes an unacceptable viscosity increase.

The respective paints so obtained are then applied on to cold rolled steel plates (10×15 cm) at a dry film thickness of 75 microns. The films are then cured for 7 days at 20° C. A white polyurethane topcoat is then applied and cured at 80° for 45 minutes.

The cured paint surface is scribed (7×0.05 cm) until the metal is reached, using bonder cross-cut device. An edge protection agent (Icosit ® 255) is applied to the edges in order to protect them.

The samples are now subjected to a salt spray test as specified in ASTM B 117 for a duration of 1000 hours. The condition of the coating is assessed after every 200 hours of weathering, specifically the degree of blistering (as specified in DIN 53,209) at the cross-cut and on the painted surface and also the degree of rusting (as specified in DIN 53,210) on the entire surface.

At the end of the test, the coating is removed, and the corrosion of the metal at the cross-cut (as specified in DIN 53,167) and also over the remainder of the surface is assessed. In every case the assessment is made on the basis of a 6-stage scale. The corrosion protection value CP is given by the sum of the assessment of the coating and the assessment of the metal surface. The higher this value, the more effective the inhibitor under test.

The results are set out in Table II.

TABLE II

| Example | Additive | % Additive | Assessment of coating | Assessment of metal | CP |
|---|---|---|---|---|---|
| — | Control | nil | 2.6 | 4.3 | 6.9 |
| 6 | Product Ex. 1 | 1.0 | 4.0 | 4.3 | 8.3 |
| 7 | Product Ex. 2 | 1.0 | 4.0 | 3.0 | 7.0 |
| 8 | Product Ex. 3 | 1.0 | 4.0 | 4.6 | 8.6 |
| 9 | Product Ex. 4 | 1.0 | 4.0 | 4.0 | 8.0 |
| 10 | Product Ex. 5 | 1.0 | 4.0 | 4.1 | 8.1 |

EXAMPLES 11 to 15

An epoxy ester paint having 50% solids content is prepared using the following formulation:

| | |
|---|---|
| 32.90% wt. | Duroxyn ® EF 900 (60% in xylene), an epoxy resin ester supplied by Hoechst A. G. |
| 2.24% wt. | red iron oxide |
| 4.48% wt. | micronised talc |
| 11.22% wt. | barium sulphate |
| 1.49% wt. | aluminium silicate |
| 10.46% wt. | titanium dioxide |
| 0.29% wt. | anti-skinning agent |
| 0.10% wt. | cobalt naphthenate (8%) |
| 36.82% wt. | 4:1 mixture of white spirit/aromatic. |

1.5 g (3% on total solids content) of a product of Examples 1 to 5 is dispersed into separate samples of the paint so formulated.

Each paint sample is then applied on to cold roll steel plates (10×15 cm) at a dry film thickness of 55-60 microns. The films are cured at 20° C. for 7 days.

The respective plates are then scirbed and subjected to the salt spray test procedure (600 hours) described in Examples 6 to 10. The results are set out in Table III:

TABLE III

| Example | Additive | % Additive | Assessment of coating | Assessment of metal | CP |
|---|---|---|---|---|---|
| — | Control | nil | 4.2 | 2.5 | 6.7 |
| 11 | Product Ex. 1 | 3 | 4.2 | 4.9 | 9.1 |
| 12 | Product Ex. 2 | 3 | 4.2 | 4.4 | 8.6 |
| 13 | Product Ex. 3 | 3 | 4.0 | 4.4 | 8.4 |
| 14 | Product Ex. 4 | 3 | 4.4 | 4.8 | 9.2 |
| 15 | Product Ex. 5 | 3 | 4.2 | 3.8 | 8.0 |

EXAMPLES 16 to 19

An aqueous alkaline paint formulation having a solids content of 56.15 wt % is prepared using the following formulation:

| | |
|---|---|
| 60.03 wt % | Bayhydrol ® B 30 (30% in water), an aqueous alkyd resin supplied for Bayer A. G. |
| 0.14 wt % | Servosyn ® WEB (8%), a siccative (Servo B. B.) |
| 0.28 wt % | Ascinin ® R |
| 21.13 wt % | Bayferrox ® 130M, an iron red oxide (Bayer AG) |
| 5.15 wt % | Heladol ® 10 (calcium carbonate) |
| 10.6 wt % | micronised talc |
| 0.2 wt % | Aerosil ® 300 (a thixotropic agent ex Degussa) |
| 1.06 wt % | ZnO |
| 0.9 wt % | butylglycol |
| 0.05 wt % | aluminium octoate |
| 0.46 wt % | water. |
| 0.56 wt % | (1% by weight on solids content) of a product of Examples 1 to 5 is dispersed in separate samples of the paint formulation. |

Each paint sample is applied on to cold roll steel plates at a layer thickness of 55-60 microns, and dried for 72 hours at 20° C. The painted plates are then placed in a sealed chamber and exposed for 700 hours to condensed moisture at 40° C./100% relative humidity. The results are summarised in the following Table IV

TABLE IV

| Example | Additive | % Additive | Assessment of coating | Assessment of metal | CP |
|---|---|---|---|---|---|
| — | Control | nil | 5.4 | 1.7 | 7.1 |
| 16 | Product Ex. 1 | 1 | 5.8 | 5.0 | 10.8 |
| 17 | Product Ex. 2 | 1 | 5.1 | 4.8 | 8.9 |
| 18 | Product Ex. 3 | 1 | 6.0 | 5.0 | 11.0 |
| 19 | Product Ex. 4 | 1 | 5.4 | 4.9 | 10.3 |

EXAMPLES 20 to 23

A two-pack polyurethane primer is prepared according to the following formulations:

| | |
|---|---|
| 57.9 wt % | Macrynal ® 5M 510n (an acrylic resin containing hydroxyl groups, Hoechst A. G.) |
| 0.3 wt % | Aerosil ® R972 (silicon anti-settling agent) |
| 26.3 wt % | titanium dioxide RN59 |
| 8.5 wt % | butyl glycol acetate |
| 0.07 wt % | zinc octoate |
| 4.03 wt % | Solvesso ® 100 (mixture of aromatic solvents ex Esso A. G.) |
| 2.1 wt % | methyl isobutyl ketone |
| 0.2 wt % | BYK 344 (gloss improver, Byk-Mallinckrodt) |
| 0.6 wt % | BYK 0 (an antifoam agent) |

The above components are dispersed on a ball mill and then 23.3 g of Desmodur ® N75 are added. The viscosity properties of the paints so obtained are set out in Table V

TABLE V

| Example | Additive | % Additive | Initial viscosity (poise) | Viscosity after 20 mins (poise) |
|---|---|---|---|---|
| — | Control | nil | 4.1 | 4.6 |
| 20 | Product Ex. 1 | 2% | 5.2 | 5.9 |
| 21 | Product Ex. 2 | 2% | 5.2 | 5.7 |
| 22 | Product Ex. 3 | 2% | 4.8 | 5.2 |
| 23 | Product Ex. 4 | 2% | 5.1 | 5.5 |

It can be seen that no significant viscosity increase is experienced with amine salts of the invention, in contrast with the parent free carboxylic acid which causes rapid increase in viscosity.

After dilution to spray viscosity, the respective paints are applied on to cold rolled steel plates and baked at 80° C./45 min. and then over-baked at 130° C./60 min. to ascertain any yellowing. The results are summarized in Table VI

TABLE VI

| | | Yellowness Index after | |
|---|---|---|---|
| Example | Additive | 80° C./45 min | 80° C./45 min + 130° C./60 min |
| — | Control | 3.3 | 3.4 |
| 20 | Product of Ex. 1 | 4.2 | 5.5 |
| 21 | Product of Ex. 2 | 4.7 | 6.0 |
| 22 | Product of Ex. 3 | 4.0 | 4.8 |
| 23 | Product of Ex. 4 | 4.1 | 5.6 |

Much more severe yellowing is noted when the amine salts of the invention are replaced by the parent carboxylic acid.

EXAMPLE 24

25.9 Parts of di-n-butylamine are added to a solution of 28.3 parts of benzothiazol-2-ylthiosuccinic acid in 150 parts tetrahydrofuran. Evaporation of this solution gives 44.3 parts bis(di-n-butylammonium)benzothiazol-2-ylthiosuccinate as an off white solid having the following analysis C 59.92; H 8.93; N 7.80%.

EXAMPLE 25

482 Parts of di-n-octylamine are added to a solution of 28.3 parts of benzothiazol-2-ylthiosuccinic acid in 150 parts tetrahydrofuran. Evaporation of this solution gives 51.2 parts bis(di-n-octylammonium)benzothiazol-2-ylthiosuccinate as a yellow powder, melting range 142°–8° C.

EXAMPLE 26

60 Parts of eicosylamine are added to a solution of 28.3 parts of benzothiazol-2-ylthiosuccinic acid in 100 parts tetrahydrofuran. Evaporation of this solution gives 86.9 parts bis(eicosylammonium)benzothiazol-2-ylthiosuccinate as a brown oil having the following analysis C 69.6; H 10.87; N 5.06%.

EXAMPLE 27

14.6 Parts of diethylamine are added to a solution of 28.3 parts of benzothiazole-2-ylthio succinic acid in 100 parts ethyl alcohol. Evaporation of this solution gives 38.3 g bis(diethylammonium)benzothiazol-2-ylthiosuccinate as a viscous oil having the following analysis C 50.0; H 7.04; N 8.78%.

EXAMPLE 28

5.8 Parts of methylamine are added to a solution of 28.3 parts of benzothiazole-2-ylthiosuccinic acid in 100 parts ethyl alcohol. Filtration of the resulting mixture gives 11.6 parts bis(methylammonium)benzothiazol-2-ylthiosuccinate having the following analysis C 45.6; H 4.4; N 8.8%.

EXAMPLE 29

19.8 Parts of cyclohexylamine are added to a solution of 28.3 parts of benzothiazole-2-ylthiosuccinic acid in 150 parts ethyl alcohol. Filtration of the resulting mixture gives 34 parts bis(cyclohexylammonium)benzothiazol-2-ylthiosuccinate.

EXAMPLE 30

21.4 Parts of benzylamine are added to a solution of 28.3 parts of benzothiazole-2-ylthio succinic acid in 150 parts tetrahydrofuran. Evaporation of the solution gave bis(benzylammonium)benzothiazol-2-ylthiosuccinate as a yellow powder having the following analysis C 60.43; H 5.5; N 8.4%.

EXAMPLE 31

31.4 Parts of tetramethylpiperidin-4-ol are added to a solution of 28.3 parts of benzothiazole-2-ylthio succinic acid in 200 parts ethyl alcohol. Evaporation of the resulting solution gave 55.2 parts bis(tetramethyl piperidinolammonium)benzothiazol-2-ylthiosuccinate having the following analysis C 58.3; H 7.87; N 7.04%.

EXAMPLES 32-39

An aqueous alkaline paint formulation was prepared as described in examples 16 to 19.

The painted plates are a) scribed and subjected to the salt spray test procedure (168 hours) or b) placed in a sealed chamber and exposed for 800 hours to condensed moisture at 40° C./100% relative humidity.

The results are summarised in tables VII and VIII

TABLE VII

| | | Testing Method a) | | | |
|---|---|---|---|---|---|
| Example | Additive | % Additive | Assessment of coating | Assessment of metal | CP |
| — | Control | nil | 2.0 | 0.6 | 2.6 |
| 32 | Product Ex. 27 | 1 | 2.3 | 1.7 | 4.0 |
| 33 | Product Ex. 28 | 1 | 4.8 | 2.3 | 7.1 |
| 34 | Product Ex. 29 | 2 | 3.2 | 3.5 | 6.7 |
| 35 | Product Ex. 31 | 2 | 4.4 | 1.7 | 6.1 |

TABLE VIII

| | | Testing Method b) | | | |
|---|---|---|---|---|---|
| Example | Additive | % Additive | Assessment of coating | Assessment of metal | CP |
| — | Control | nil | 5.4 | 1.9 | 7.1 |
| 36 | Product Ex. 24 | 2 | 5.2 | 3.5 | 8.7 |
| 37 | Product Ex. 25 | 2 | 6.0 | 5.7 | 11.7 |
| 38 | Product Ex. 26 | 2 | 5.9 | 1.7 | 7.6 |
| 39 | Product Ex. 27 | 2 | 6.0 | 1.7 | 7.7 |

EXAMPLE 40

An electrodepositable thermosetting cationic urethane-modified aqueous coating composition is prepared according to Example 1 of U.S. Pat. No. 4,148,772. To this composition are added 1% and 2%, related to the solid content of the composition, of the product of Example 1 which is soluble in the composition. The coating is electrodeposited cathodically on zinc-phosphated cold rolled steel panels at a voltage of 200 V for 4 minutes. The coatings are afterwards stoved for 25 minutes at 180° C.

The surface of the coated samples is scribed with a Bonder Crosscutter and the samples are subjected to the salt spray test according to ASTM B 117 for a duration of 600 hours. At the end of the test the corrosion of the coating and of the metal is assessed as described in Examples 6–10. The results are shown in table IX

TABLE IX

| Additive | Assessment of Coating | Assessment of Metal | CP |
|---|---|---|---|
| none | 2.2 | 1.3 | 3.5 |
| 1% Product of Ex. 1 | 2.9 | 4.6 | 7.5 |
| 2% Product of Ex. 1 | 3.3 | 4.8 | 8.8 |

EXAMPLE 41

Following the general procedure of Example 7 of Japanese Sho 63-301271, benzothiazol-2-ylthiosuccinic acid and two molar equivalents of isobutylamine are reacted to give bis(isobutylammonium) benzothiazol-2-ylthiosuccinate.

EXAMPLE 42

Following the general procedure of Example 1, benzothiaxol-2-ylthiosuccinic acid and two molar equivalents of a 50:50 molar mixture of isobutylamine and decylamine are reacted to give the amine salt of the formula

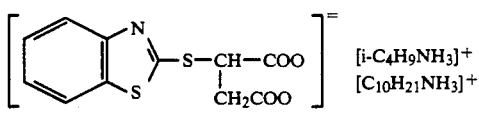

EXAMPLE 43

Following the general procedure of Examples 6–10, cold rolled steel plates (Q-panel S) are coated with an epoxy/polyamide primer to a dry film thickness of 2 mils (0.0508 mm) and then with a white polyurethane topcoat to a dry film thickness of 2.3 mils (0.0584 mm).

The coated sheets are then exposed to 96 hours of humidity testing according to ASTM D 4585-87. The results are given in the table below.

| Additive of Example | Wt %* | Cathodic (mm) Delamination | Appearance Unscribed Areas/Metal Surface |
|---|---|---|---|
| None | — | >50 | completely rusted, severe face rust |
| 41 | 1 | >50 | severe face rust |
| 41 | 2 | 19–20 | few rust spots |
| 41 | 3 | 12 | unchanged |
| 42 | 1 | 20–30 | few rust spots |
| 42 | 2 | 8 | unchanged |
| 42 | 3 | 6–7 | unchanged |

*based on total solids

The coated sheets are also exposed to salt spray testing according to ASTM B 117 for 240 hours. The results are given in the table below.

| Additive of Example | Wt %* | Cathodic (mm) Delamination | Visible Corrosion along Scribe (mm) |
|---|---|---|---|
| None | — | 33 | 2–4 |
| 41 | 1 | 29 | 3–6 |
| 41 | 2 | 25 | 2–4 |
| 41 | 3 | 19 | 2–4 |
| 42 | 1 | 27 | 0–3 |
| 42 | 2 | 22 | 0–3 |
| 42 | 3 | 18 | 0–3 |

*based on total solids

In the humidity test, the instant compound of Example 42 clearly exhibits superior performance compared to the prior art compound of Example 41 at all of the test concentrations, but the prior art compound does show increasing efficacy when the concentration of the amine salt is raised.

In the salt spray test, the differences between the instant and prior art compounds are less pronounced although the instant compound consistently shows somewhat less delamination from the scribe and less visible corrosion along the scribe line compared to the prior art compound.

It is noted that due to the higher molecular weight of the instant compound compared to the prior art compound the actual concentration of the benzothiazol-2-ylthio moiety (the active species) in the instant compounds is lower than in the prior art compound accentuating the greater effectiveness of the instant compound compared to the prior art compound.

What is claimed is:

1. A corrosion-inhibiting coating composition comprising
   (a) an acid-sensitive film former selected from the group consisting of an epoxide resin, polyurethane resin, aminoplast resin, or a mixture of such resins or a basic aqueous dispersion or solution of an acidic resin, and
   (b) an effective corrosion inhibiting amount of an amine salt of an aliphatic or cycloaliphatic dicarboxylic acid of formula II

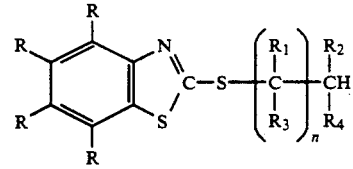

in which each R independently of the others is hydrogen, alkyl of 1 to 12 carbon atoms, halogenoalkyl of 1 to 4 carbon atoms, alkoxy of 1 to 12 carbon atoms, alkylthio of 1 to 12 carbon atoms, alkylsulfonyl of 1 to 12 carbon atoms, cycloalkyl of 5 to 8 carbon atoms, phenyl, alkylphenyl of 7 16 carbon atoms, phenylalkyl of 7 to 9 carbon atoms, halogen, —CN, —NO$_2$, —COOH, —COOalkyl where alkyl is of 1 to 4 carbon atoms, —OH or a primary, secondary or tertiary amino or carbamoyl group of up to 20 carbon atoms;

n is zero or one;

$R_1$, $R_2$, $R_3$ and $R_4$ independently of one another are hydrogen, alkyl of 1 to 18 carbon atoms, hydroxyalkyl of 1 to 4 carbon atoms, alkoxyalkyl of 2 to 10 carbon atoms, carboxylalkyl of 2 to 12 carbon atoms, carboxyl, phenyl or phenylalkyl of 7 to 9 carbon atoms, or $R_1$ and $R_2$ or $R_1$ and $R_3$ together are linear or branched alkylene of 3 to 4 carbon atoms, where two of the substituents $R_1$, $R_2$, $R_3$ and $R_4$ are carboxyl or carboxyalkyl;

with two molar equivalents of an amine or mixture of amines of the formula N(X)(Y)(Z) in which X, Y and Z are the same or different and each is independently hydrogen, alkyl of 1 to 24 carbon atoms, said alkyl interrupted by one or more oxygen atoms, hydroxyalkyl of 1 to 4 carbon atoms, phenyl, phenylalkyl of 7 to 9 carbon atoms or alkylphenyl of 7 to 16 carbon atoms, and where at least one of X, Y and Z or at least one of X, Y and Z in at least one of the amines when a mixture of amines is used is alkyl of 10 to 24 carbon atoms or said alkyl interrupted by one or more oxygen atoms.

2. A composition according to claim 1 wherein one of the substituents R is hydrogen, $C_1$–$C_4$-alkyl or $C_1$–$C_4$-alkoxy and the other three R are hydrogen.

3. A composition according to claim 1 wherein all four substituents R are hydrogen.

4. A composition according to claim 1 wherein n is 1.

5. A composition according to claim 1 wherein the salt of component (b) is

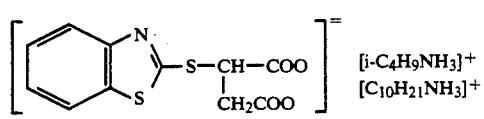

6. An amine salt which is an amine salt of an aliphatic or cycloaliphatic dicarboxylic acid of formula II

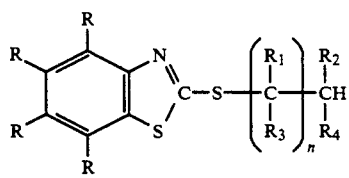

in which each R independently of the others is hydrogen, alkyl of 1 to 12 carbon atoms, halogenoalkyl of 1 to 4 carbon atoms, alkoxy of 1 to 12 carbon atoms, alkylthio of 1 to 12 carbon atoms, alkylsulfonyl of 1 to 12 carbon atoms, cycloalkyl of 5 to 8 carbon atoms, phenyl, alkylphenyl of 7 of 16 carbon atoms, phenylalkyl of 7 to 9 carbon atoms, halogen, —CN, —NO$_2$, —COOH, —COOalkyl where alkyl is of 1 to 4 carbon atoms, —OH or a primary, secondary or tertiary amino or carbamoyl group of up to 20 carbon atoms;

n is zero or one;

$R_1, R_2, R_3$ and $R_4$ independently of one another are hydrogen, alkyl of 1 to 18 carbon atoms, hydroxyalkyl of 1 to 4 carbon atoms, alkoxyalkyl of 2 to 10 carbon atoms, carboxyalkyl of 2 to 12 carbon atoms, carboxyl, phenyl or phenylalkyl of 7 to 9 carbon atoms, or $R_1$ and $R_2$ or $R_1$ and $R_3$ together are linear or branched alkylene of 3 to 4 carbon atoms, where two of the substituents $R_1$, $R_2$, $R_3$ and $R_4$ are carboxyl or carboxyalkyl;

with two molar equivalents of an amine or mixture of amines of the formula N(X)(Y)(Z) in which X, Y and Z are the same or different and each is independently hydrogen, alkyl of 1 to 24 carbon atoms, said alkyl interrupted by one or more oxygen atoms, hydroxyalkyl of 1 to 4 carbon atoms, phenyl, phenylalkyl of 7 to 9 carbon atoms or alkylphenyl of 7 to 16 carbon atoms, and where at least one of X, Y and Z or at least one of X, Y and Z in at least one of the amines when a mixture of amines is used is alkyl of 10 to 24 carbon atoms or said alkyl interrupted by one or more oxygen atoms.

7. A salt according to claim 6 wherein one of the substituents R is hydrogen, $C_1$–$C_4$-alkyl or $C_1$–$C_4$-alkoxy and the other three R are hydrogen.

8. A salt according to claim 6 wherein all four substituents R are hydrogen.

9. A salt according to claim 6 wherein n is 1.

10. A salt according to claim 6 which is

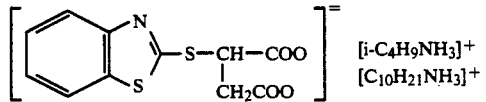

11. The salt according to claim 6 which is bis(tert-tridecylammonium) benzothiazol-2-ylthiosuccinate.

12. The salt according to claim 6 which is bis-(isononyloxypropylammonium) benzothiazol-2-ylthiosuccinate.

* * * * *